United States Patent
Kim et al.

(10) Patent No.: US 7,996,448 B2
(45) Date of Patent: *Aug. 9, 2011

(54) RECORDING MEDIUM, AND METHOD AND APPARATUS FOR REPRODUCING DATA FROM THE RECORDING MEDIUM

(75) Inventors: Kun Suk Kim, Anyang-si (KR); Kang Soo Seo, Seongnam-si (KR); Byung Jin Kim, Anyang-si (KR); Jea Yong Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/654,791

(22) Filed: Jan. 4, 2010

(65) Prior Publication Data

US 2010/0110845 A1    May 6, 2010

Related U.S. Application Data

(62) Division of application No. 11/333,230, filed on Jan. 18, 2006, now Pat. No. 7,668,844.

(60) Provisional application No. 60/645,036, filed on Jan. 21, 2005.

(30) Foreign Application Priority Data

Apr. 22, 2005 (KR) .......................... 10-2005-0033484
Apr. 22, 2005 (KR) .......................... 10-2005-0033485

(51) Int. Cl.
*G06F 12/00* (2006.01)
*G06F 17/30* (2006.01)

(52) U.S. Cl. ..................... 707/823; 707/828; 369/30.01; 369/30.85; 386/94

(58) Field of Classification Search ................... 707/823, 707/828; 369/30.01, 30.85, 85; 386/94
See application file for complete search history.

(56) References Cited

U.S. PATENT DOCUMENTS

| | | | |
|---|---|---|---|
| 6,128,434 A | 10/2000 | Hirayama et al. | 386/97 |
| 6,340,992 B1 | 1/2002 | Markandey | 348/556 |
| 6,594,692 B1 | 7/2003 | Reisman | 709/219 |
| 6,959,310 B2 | 10/2005 | Eshel et al. | 707/200 |
| 7,043,503 B2 | 5/2006 | Haskin et al. | 707/200 |

(Continued)

FOREIGN PATENT DOCUMENTS

CN    1954384    4/2007

(Continued)

OTHER PUBLICATIONS

Alexander M. Reznik and Dmitry A. Dziuba—"Dynamic Associative Memory, Based on Open Recurrent Neural Network"—Proceedings of International Joint Conference on Neural Networks, Atlanta, Georgia, USA, Jun. 14-19, 2009 (pp. 1-7).*

(Continued)

*Primary Examiner* — John Breene
*Assistant Examiner* — Anh Ly
(74) *Attorney, Agent, or Firm* — Harness, Dickey & Pierce, P.L.C.

(57) ABSTRACT

A method and apparatus for reproducing data from a recording medium are disclosed. The method and apparatus calls for downloading data associated with data read from the recording medium. The downloaded data is stored in a local storage using an organization ID directory. The downloaded data from the local storage and the data from the recording medium are ultimately bound together to form a virtual package.

10 Claims, 11 Drawing Sheets

U.S. PATENT DOCUMENTS

| | | | |
|---|---|---|---|
| 7,222,133 B1 * | 5/2007 | Raipurkar et al. | 707/642 |
| 7,502,801 B2 | 3/2009 | Sawdon et al. | 707/100 |
| 7,711,759 B2 * | 5/2010 | Seo et al. | 707/823 |
| 7,783,172 B2 * | 8/2010 | Seo et al. | 369/30.01 |
| 2002/0099661 A1 * | 7/2002 | Kii et al. | 705/51 |
| 2003/0039472 A1 | 2/2003 | Kim | 386/126 |
| 2003/0142961 A1 | 7/2003 | Oh et al. | 386/95 |
| 2003/0159007 A1 | 8/2003 | Sawdon et al. | 711/154 |
| 2003/0215224 A1 | 11/2003 | Yoo et al. | |
| 2003/0217091 A1 | 11/2003 | Echigo et al. | |
| 2004/0114910 A1 | 6/2004 | Seo et al. | 386/95 |
| 2004/0223741 A1 | 11/2004 | Yoo et al. | 386/95 |
| 2005/0010596 A1 | 1/2005 | Yoneyama | |
| 2005/0018854 A1 | 1/2005 | Yamamoto et al. | 380/277 |
| 2005/0050110 A1 | 3/2005 | Sawdon et al. | 707/201 |
| 2005/0114295 A1 | 5/2005 | Takashima | 707/1 |
| 2005/0131998 A1 | 6/2005 | Takashima | 709/203 |
| 2005/0141867 A1 | 6/2005 | Seo et al. | 386/69 |
| 2005/0196149 A1 | 9/2005 | Yoo et al. | 386/95 |
| 2005/0262149 A1 | 11/2005 | Jung et al. | |
| 2006/0045481 A1 | 3/2006 | Yahata et al. | 386/95 |
| 2006/0077773 A1 * | 4/2006 | Seo et al. | 369/30.09 |
| 2006/0077817 A1 | 4/2006 | Seo et al. | 369/47.1 |
| 2006/0098936 A1 | 5/2006 | Ikeda et al. | 386/46 |
| 2006/0120223 A1 * | 6/2006 | Seo et al. | 369/30.01 |
| 2006/0140091 A1 | 6/2006 | Iwamoto et al. | 369/53.2 |
| 2006/0143666 A1 | 6/2006 | Okada et al. | 725/89 |
| 2006/0155786 A1 * | 7/2006 | Seo et al. | 707/204 |
| 2006/0165388 A1 | 7/2006 | Uesaka et al. | 386/125 |
| 2006/0282612 A1 | 12/2006 | Ikeda et al. | 711/111 |
| 2007/0089156 A1 | 4/2007 | Ikeda et al. | 725/135 |
| 2007/0168180 A1 | 7/2007 | Park et al. | 704/9 |

FOREIGN PATENT DOCUMENTS

| | | |
|---|---|---|
| EP | 1 551 027 A1 | 7/2005 |
| EP | 1 553 769 A1 | 7/2005 |
| RU | 2170494 | 7/2001 |
| WO | WO 03/090225 | 10/2003 |
| WO | WO 2004/025651 A1 | 3/2004 |
| WO | WO 2004/030356 A1 | 4/2004 |
| WO | 2004/097661 A1 | 11/2004 |
| WO | WO 2005/052941 | 6/2005 |

OTHER PUBLICATIONS

David Luebke and Mark Harris—"GPGPU: General Purpose Computation on Graphics Hardware" SIGGRAPH, 2004 (pp. 1-289).*

"WFS: A Simple Shared File System for a Distributed Environment"—Daniel Swinehart, Gene McDaniel and David Boggs—Proceedings of the 7$^{th}$ ACM Symposium on Operating Systems priciples—1979 (pp. 9-17).

"LegionFS: A Secure and Scalable File System Supporting Cross-Domain High-Performance Applications"—brian S. White, Michael Walker, Marty Humphrey and Andrew S. Grimshaw—Conference on high performance networking and computing—2001 ACM/IEEE (pp. 59-59).

"Optimal Placement of replicas in tree with read, write and storage costs"—Konstantinos Kalpakis, Koustuv Dasgupta and Ouri Wolfson—IEEE Transactions on Parallel and Distributed Systems, vol. 12, No. 6, June 2001 (pp. 628-637).

International Search Report issued Aug. 25, 2006 in corresponding International Patent Application No. PCT/KR2006/000200.

Office Action issued Jun. 5, 2009 by the Chinese Patent Office in counterpart Chinese Patent Application No. 200680002392.9.

Search Report issued Sep. 14, 2009 by the European Patent Office in counterpart European Patent Application No. 06701198.1-2223.

Russian Office Action dated Nov. 5, 2009 for corresponding application No. 2007131695/28(034542).

Russian Notice of Allowance dated Jul. 7, 2010 for corresponding Application No. 2007131695/28.

European Search Report dated Apr. 15, 2010 for corresponding Application No. 06 70 1198.1.

XP007903517, White Paper Blu-ray Disc Format, 2B, AV Applications Format Specification for BD-ROM, Mar. 2005.

XP002547994, White Paper, Blu-ray Disc Format: General, p. 36.

European Office Action dated Mar. 29, 2011 for corresponding European Application No. 06701198.1.

XP2315435, White Paper Blu-ray Disc Format, 2.B Audio Visual Application Format Specifications for BD-Rom, Aug. 2004.

* cited by examiner

RECORDING MEDIUM, AND METHOD AND APPARATUS FOR REPRODUCING DATA FROM THE RECORDING MEDIUM

This is a divisional of U.S. application Ser. No. 11/333,230, now U.S. Pat. No. 7,668,844 B2, which claims the benefit of Korean Patent Application No. 10-2005-0033484, filed on Apr. 22, 2005 and 10-2005-0033485, filed on Apr. 22, 2005, which are hereby incorporated by reference as if fully set forth herein.

U.S. application Ser. No. 11/333,230 also claims the benefit of U.S. Provisional Application No. 60/645,036, filed on Jan. 21, 2005, in the name of inventors Kun Suk, KIM entitled "Method for updating BD-J objects and index", which is hereby incorporated by reference as if fully set forth herein.

BACKGROUND OF THE INVENTION

1. Field of the Invention

The present invention relates to a recording medium, and more particularly to a disc file structure for effectively reproducing data having different attributes recorded in the recording medium, and a method and apparatus for reproducing data recorded in the recording medium and data downloaded from a content provider (CP).

2. Discussion of the Related Art

Generally, there has been widely used an optical disc acting as a recording medium capable of recording a large amount of data therein. Particularly, there has recently been developed a high-density optical recording medium capable of recording/ storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, many developers have conducted intensive research into the international standard technical specification associated with the BD along with those of other digital devices.

In association with the above-mentioned situation, there has recently been developed an optical recording/reproducing device based on the BD international standard, but the BD international standard has not yet been completed, such that many limitations and obstacles to the development of the optical recording/reproducing device remain.

Particularly, the above-mentioned optical recording/reproducing device must consider not only a basic function for recording/reproducing data of the BD, but also an additional function for enabling the optical recording/reproducing device to interact with peripheral digital devices. In other words, the optical recording/reproducing device must receive an external input signal, must display the received signal, and must reproduce desired data using the external input signal and the BD.

However, an apparatus for reproducing data from the recording medium to simultaneously reproduce the external input signal and data of the BD has not yet been established, such that many limitations and problems occur in developing a BD-based optical recording/reproducing device.

SUMMARY OF THE INVENTION

Accordingly, the present invention is directed to a recording medium, and a method and apparatus for reproducing data from the recording medium that substantially obviate one or more problems due to limitations and disadvantages of the related art.

An object of the present invention is to provide a management file structure for managing data having a variety of attributes recorded in a recording medium.

Another object of the present invention is to provide a method and apparatus for simultaneously reproducing data recorded in the recording medium and data downloaded from an external part.

Still another object of the present invention is to provide a method for allowing a content provider (CP) to simultaneously transmit desired data and an updated file association with the recording medium.

Still another object of the present invention is to provide a method for downloading data from an external part, storing the downloaded data in a local storage, and forming a virtual package to simultaneously reproduce data stored in a recording medium and the data stored in the local storage.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for reproducing data of a recording medium comprising the steps of: a) receiving updated data associated with the recording medium from a content provider (CP), and storing the received data in a local storage; b) recognizing a binding unit associated with the recording medium from the local storage; c) combining or binding the binding unit with data of the recording medium, and forming a virtual package; and d) reproducing the data recorded in the recording medium and/or data recorded in the local storage using the formed virtual package.

In another aspect of the present invention, there is provided a data transmission method when a content provider (CP) transmits data, the method comprising the steps of: a) recognizing type information of a recording medium; and b) transmitting index and object files capable of simultaneously reproducing original data recorded in the recording medium and additional data received from the content provider (CP).

In yet another aspect of the present invention, there is provided an apparatus for reproducing data of a recording medium comprising: a pickup unit for reading original data from a recording medium; a local storage for storing additional data associated with the original data; and a controller for forming a virtual file system to reproduce the original data and/or the additional data and checking a disc ID, and forming a virtual package equipped with the additional data associated with the original data using the virtual file system, wherein the additional data downloaded in the local storage includes updated index and object files.

In yet another aspect of the present invention, there is provided a method for reproducing data of a recording medium comprising the steps of: a) reading a binding unit associated with a loaded recording medium from a local storage; b) combining or binding the binding unit with a file structure (i.e., a disc package) contained in the recording medium, and forming a virtual package including updated index and object files; and c) reproducing the data recorded in the recording medium and/or data recorded in the local storage using the formed virtual package.

In yet another aspect of the present invention, there is provided an apparatus for reproducing data of a recording medium using a local storage comprising: a pickup unit for reading original data from a recording medium; a local storage for storing additional data associated with the original data; and a controller for forming a virtual file system to reproduce the original data and/or the additional data, and forming a virtual package capable of simultaneously reproducing the original data and the additional data using the virtual file system, wherein the controller forms updated index and object files to simultaneously reproduce data recorded in the recording medium and data downloaded from a content provider (CP), and includes the updated index and object files in the virtual package.

In yet another aspect of the present invention, there is provided a recording medium comprising: a title record area in which a first title and a second title having different attributes are recorded; and a management area in which a first management file for reproducing the first title and a second management file for reproducing the second title are recorded, wherein the management area stores individual index files for reproducing the first title and the second title, and separately records at least one first object file equipped with a presentation scenario of the first title and at least one second object file equipped with a presentation scenario of the second title.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
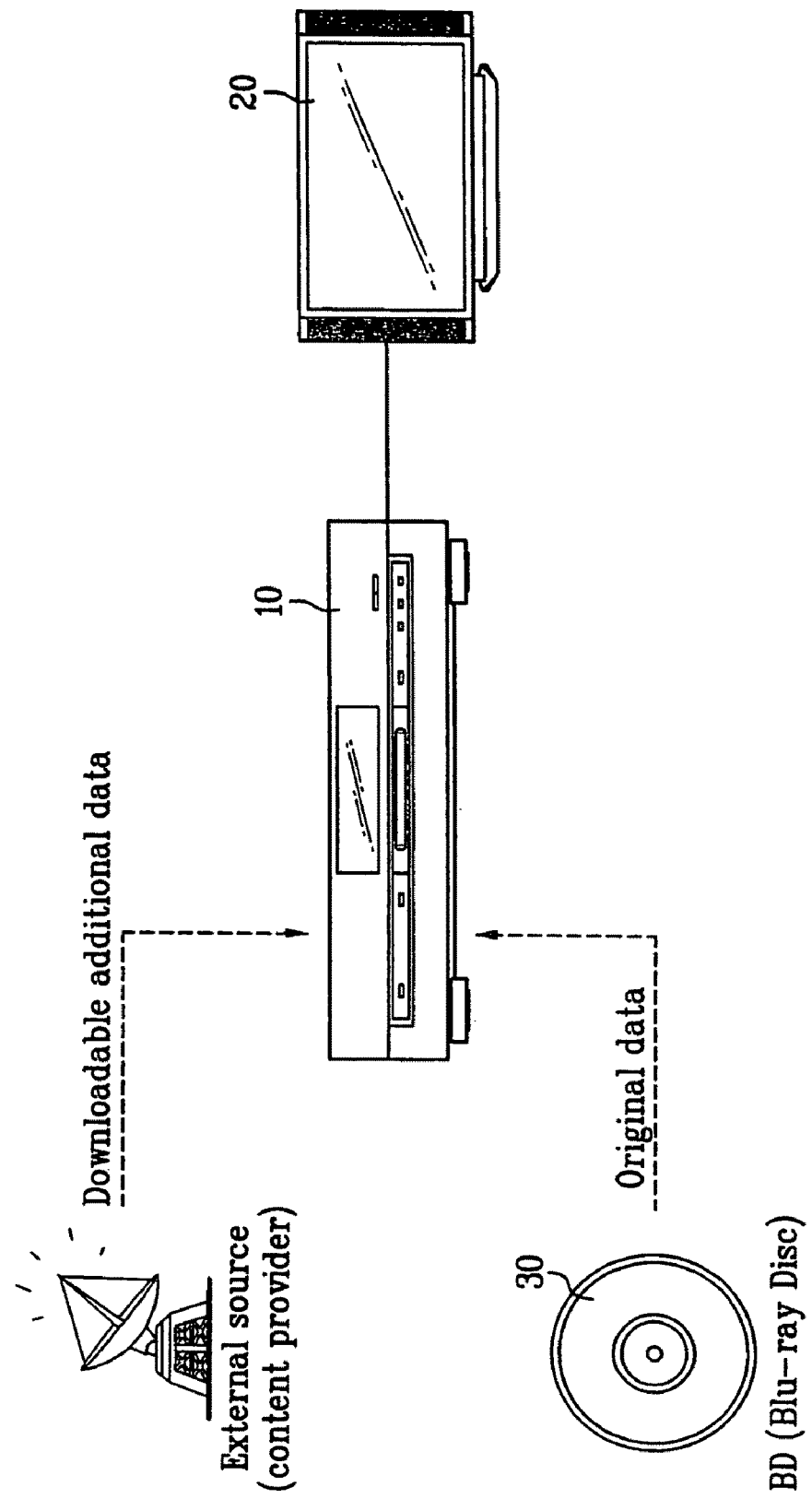
FIG. 1 is a conceptual diagram illustrating a method and apparatus for reproducing data from a recording medium according to the present invention.

Reference will now be made in detail to the preferred embodiments of the present invention, examples of which are illustrated in the accompanying drawings. Wherever possible, the same reference numbers will be used throughout the drawings to refer to the same or like parts.

A recording medium, and a method and apparatus for reproducing data from a recording medium will hereinafter be described with reference to the annexed drawings.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc., according to various recording schemes. For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

The term "local storage" is indicative of a storage unit contained in an optical recording/reproducing device. In more detail, the term "local storage" is indicative of a component capable of receiving necessary information or data from a user, and storing the received information or data. For example, a general local storage may be indicative of a Hard Disc Drive (HDD), but it should be noted that the term "local storage" of the present invention is not limited to the HDD, and is applicable to other examples as necessary.

Particularly, the term "local storage" is indicative of a storage unit for storing data associated with a recording medium such as a BD. The data associated with the recording medium is generally downloaded from an external device.

In association with the above-mentioned description, it is obvious to those skilled in the art that the local storage may directly read some permission data from the recording medium, and may generate system data (e.g., metadata) associated with record/reproduction operations of the recording medium, such that the system data may be stored in the local storage.

The term "binding unit" is indicative of a set of files stored in the local storage. Particularly, the binding unit is indicative of a set of information (i.e., information set) associated with a specific recording medium. In this case, the information set is combined with or is added to a file contained in the recording medium, such that it can simultaneously reproduce data of the recording medium and data of the local storage. A detailed description thereof will be described later.

For the convenience of description, data recorded in the recording medium is referred to as "original data", data associated with the recording medium from among a plurality of data units, which are downloaded from an external device and are stored in the local storage, is referred to as "additional data".

The term "Title" is indicative of a reproduction unit interfacing with a user, and each title is linked to a specific object, such that a stream associated with a corresponding title recorded in a disc is reproduced according to a command or program stored in the object.

In association with the above-mentioned description, a title recorded in a disc and a disc package for reproducing the title will be described with reference to FIG. 2. Particularly, for the convenience of description and better understanding of the present invention, a first title in which movies and interactive information according to an MPEG2 compression scheme are recorded is called an HDMV title, and a second title in which movies and interactive information according to a Java program are recorded is called a Java title.

The term "Object" is indicative of reproduction management information including a command or program for reproducing the disc. In other words, a variety of objects present in a disc are linked to a specific title or are connected to other objects. Therefore, the above-mentioned objects are pre-designed according to intentions of a manufacturer or author of the disc, are recorded in the disc, and increase the number of scenarios for reproducing data of the disc. In other words, the object according to the present invention acts as a management unit including a command or program for managing reproduction scenarios of disc data.

In association with the above-mentioned description, an object for reproducing the above-mentioned "HDMV title" will hereinafter be referred to as "Movie Object" or "M-OBJ", and an object for reproducing the above-mentioned "Java Title" will hereinafter be referred to as "Java Object" or "J-OBJ".

FIG. 1 is a conceptual diagram illustrating a method and apparatus for reproducing data according to the present invention. Unified usages of the optical recording/reproducing 10 and peripheral devices are shown in FIG. 1.

The optical recording/reproducing device 10 can record/reproduce data in/from various optical discs having different formats. If necessary, the optical recording/reproducing device 10 can record/reproduce specific data in/from only a specific optical disc such as a BD, or can reproduce the data from the optical disc without recording the data in the same. It should be noted that the present invention exemplarily uses a BD-player capable of reproducing data from the BD or a BD-recorder capable of recording data in the BD in consideration of correlation between the BD and peripheral devices for the convenience of description. In association with the above-mentioned description, it is well known in the art that the optical recording/reproduction device 10 is also applicable to a drive embedded in a specific device such as a computer.

The optical recording/reproducing device 10 records or reproduces data in/from the optical disc 30, receives an external input signal, performs a signal process on the received signal, and transmits the signal processed result to the external display 20, such that a user can view the signal processed result on the display 20. In this case, there is no limitation in a receivable external signal. For example, representative external input signals may be determined to be a DTV-associated signal and an Internet-associated signal, etc. Specifically, the Internet is indicative of a communication network to which a user easily gains access, such that the user can download specific Internet data using the optical recording/reproducing device 10, and can use the downloaded data.

In association with the above-mentioned description, a person for providing content data used as an external source is generally referred to as a content provider (CP).

When original data is recorded in the optical disc 30 seated in the optical recording/reproducing device 10, and additional data associated with the original data is present in other storage places (e.g., Internet), the present invention aims to reproduce the original data and the additional data at the same time.

FIG. 1 shows a specific mode in which a title recorded in the BD-ROM from among optical discs is mixed with an HDMV title and a Java title, such that the title mixed with the HDMV and JAVA titles is recorded. The specific mode is called a full mode. The present invention provides a file structure standardized in the disc in order to reproduce data from the BD-ROM based on the full mode, and provides a method and apparatus for reproducing data from the BD-ROM.

For example, it is assumed that multiplexed AV (Audio/Video) streams are recorded as the original data recorded in the optical disc, and additional data for use in the Internet is an audio stream different from an audio stream (e.g., Korean) of the original data. In this case, some users may download a specific audio stream (e.g., English) acting as additional data from the Internet, may desire to reproduce the downloaded audio stream along with the stream acting as original data, or may desire to reproduce only the additional data. In order to implement the above-mentioned desires of the users, correlation between the original data and the additional data must be established, and there is needed a systemized method for managing/reproducing the above-mentioned data according to a user request.

For the convenience of description, although a signal recorded in the disc is referred to as the original data, and other signals existing in the outside of the disc are referred to as the additional data, it should be noted that the original data and the additional data classified according to their data acquisition methods are not limited to only specific data.

Generally, additional data may be indicative of audio data, presentation graphic (PG) data, interactive graphic (IG) data, or text subtitle, etc., but the additional data may also be indicative of a multiplexed AV stream including the above-mentioned data and video data. In other words, data associated with the original data simultaneously existing in the outside of the optical disc may act as additional data.

In order to satisfy the above-mentioned user requests, a predetermined file structure must be established between the original data and the additional data. Accordingly, a file structure and data record structure for use in the BD will hereinafter be described with reference to FIGS. 2 ⊐ 4.

Figure 2:
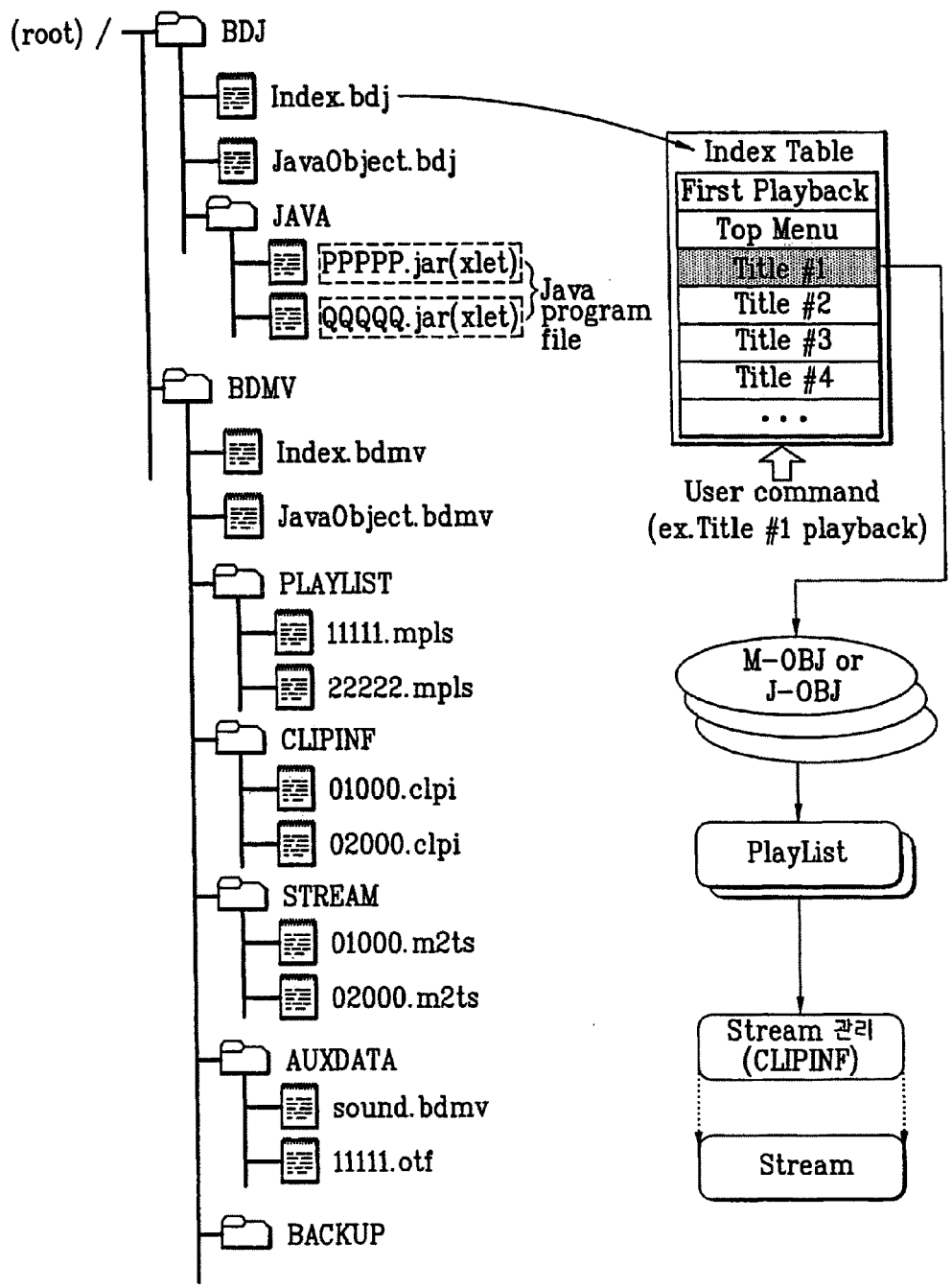
FIG. 2 is a conceptual diagram illustrating a file structure recorded in an optical disc acting as a recording medium and a relationship for reproducing data of the file structure in accordance with a preferred embodiment of the present invention.

FIG. 2 is a conceptual diagram illustrating a file structure recorded in an optical disc acting as a recording medium and a relationship for reproducing data of the file structure in accordance with a preferred embodiment of the present invention.

For example, the file structure according to the present invention may include one or more directories (e.g., a BDJ directory and a BDMV directory) under a single root directory. The BD directory (BDMV) includes not only an index file "index" acting as a general file (i.e., an upper file) capable of guaranteeing user interactivity, but also the above-mentioned object. The file structure includes a variety of directories for storing information of actual data recorded in a disc and other information associated with a method for reproducing the data, for example, a playlist directory (PLAYLIST), a clip information directory (CLIPINF), a stream directory (STREAM), an auxiliary directory (AUXDATA), and a backup directory (BACKUP). The above-mentioned directories and a variety of files included in the directory will hereinafter be described.

The AUXDATA directory includes an additional data file for reproducing data of the disc. For example, the AUXDATA directory includes a "Sound.bdmv" file for providing a user with sound data when an interactive graphic function is executed, and an "11111.otf" file for providing the user with font information when data of the disc is reproduced.

The stream directory (STREAM) includes a plurality of AV stream files recorded in a disc according to a specific format. Generally, individual streams are recorded using an MPEG-2 based transport packet, and the stream directory (STREAM) uses extension names of stream files (01000.m2ts and 02000.m2ts) as a specific extension name "*.m2ts". Particularly, if video/audio/graphic information from among the above-mentioned streams is multiplexed, the multiplexed information is called an AV stream, and a single title is composed of at least one AV stream file.

The clip information (Clip-info) directory (CLIPINF) is composed of a plurality of clip-info files (01000.clpi and 02000.clpi) connected to the above-mentioned stream files on a one-to-one basis. Particularly, the clip-info files (*.clpi) record attribute information and timing information of the stream files (*.m2ts) therein. The clip-info files (*.clpi) connected to the stream files (*.m2ts) on a one-to-one basis are generically named a "Clip". In other words, this means that a single clip is indicative of data composed of a stream file (*.m2ts) and a clip-info file (*.clpi). According to the present invention, the clip recorded in the disc is referred to as an original clip, and the clip downloaded/stored in the local storage is referred to as an additional clip.

The playlist directory (PLAYLIST) includes a plurality of playlist files (*.mpls). Each playlist file (*.mpls) includes one or more playitems (PlayItem) and one or more sub-playitems (SubPlayItem). Each playitem (PlayItem) and each sub-playitem (SubPlayItem) are adapted to designate a playing interval during which a specific clip is reproduced. The playitem (PlayItem) and the sub-playitem (SubPlayItem) include information associated with a specific clip to be reproduced, i.e., information associated with a reproduction start time (IN-Time) and other information associated with a reproduction termination time (OUT-Time) of the specific clip.

In association with the above-mentioned description, a process for reproducing data using at least one playitem (PlayItem) in the playlist file is referred to as a main path, and a process for reproducing data using individual sub-play items (SubPlayItem) is referred to as a sub-path. The playlist file must contain a single main path. The playlist file may contain at least one sub-path according to the presence or absence of the sub-playitem (SubPlayItem) as necessary.

In conclusion, the playlist file acts as a basic reproduction/management file unit contained in overall reproduction/management file structures for reproducing a desired clip by combination of one or more playitems (PlayItem).

The backup directory (BACKUP) stores a plurality of duplicate files, i.e., a duplicate file (also called "copied files") of the index file "index" storing information associated with disc reproduction, a duplicate file of the object file "MovieObject", duplicate files of all playlist files (*.mpls) contained in the playlist directory (PLAYLIST), and duplicate files of all clip-info files (*.clpi) contained in the clip-info directory (CLIPINF). If the above-mentioned files ("index", "MovieObject", "*.mpls", and "*.clpi") are damaged, a disc reproduction process is also fatally damaged, such that the backup directory (BACKUP) is designed to pre-store duplicate files of the above-mentioned files as backup files.

The BDJ directory includes an index file "index.bdj" and an object file "JavaObject.bdj" as general file information (i.e., upper file information) capable of guaranteeing user interactivity. In this case, the index file "index.bdj" and the object file "JavaObject.bdj" can be indexed by the HDMV title and the Java title, respectively. The BDJ directory includes a Java directory (JAVA). The Java directory (JAVA) records a plurality of Java program files (e.g., PPPPP.jar or QQQQQ.jar) therein. A variety of applications are programmed in individual Java program files, and each of the programmed applications may also be called an "Xlet". The Java program files are executed by a dedicated reproduction device, and a detailed description thereof will be described later with reference to FIG. 5B.

In association with the above-mentioned description, FIG. 2 shows a relationship for reproducing a specific title using the above-mentioned file structure. Specifically, upon receiving a title reproduction command from a user in association with a specific title applied to an index table of an index file, the relationship for reproducing the specific title is described in FIG. 2.

The index file (index.bdmv) includes first playback information "First Playback" indicative of information associated with a first reproduction image when data of a corresponding disc is loaded, top menu information "Top Menu" for providing a menu image, and at least one title information "Title #1 □Title #n". In association with the above-mentioned description, the above-mentioned titles "Title #1 ⨆Title #n" may be either HDMV titles or Java titles.

Thereafter, if a user selects a command for reproducing a specific title (e.g., Title #1), a specific object command or program linked to the title (Title#1) in the object file of the file structure is executed. As a result, a specific playlist is executed according to the specific object command or program linked to the title (Title#1) in the object file, and a specific clip "*clip" or "*.m2ts" is reproduced by a playitem contained in the playlist.

In association with the above-mentioned description, if the selected title (Title #1) is determined to be the HDMV title, it is reproduced by a specific object "M-OBJ" contained in a single object file. Otherwise, if the selected title (Title #1) is determined to be the Java title, it is reproduced by a specific object "J-OBJ".

In association with the above-mentioned description, the above-mentioned index file is configured in the form of "index.bdj", such that both the HDMV title and the Java title can be indexed. Otherwise, the above-mentioned index file may include a specific file for indexing only the HDMV title for the optical recording/reproducing device capable of reproducing only the HDMV title, such that it may also be configured in the form of two index files.

Figure 3:
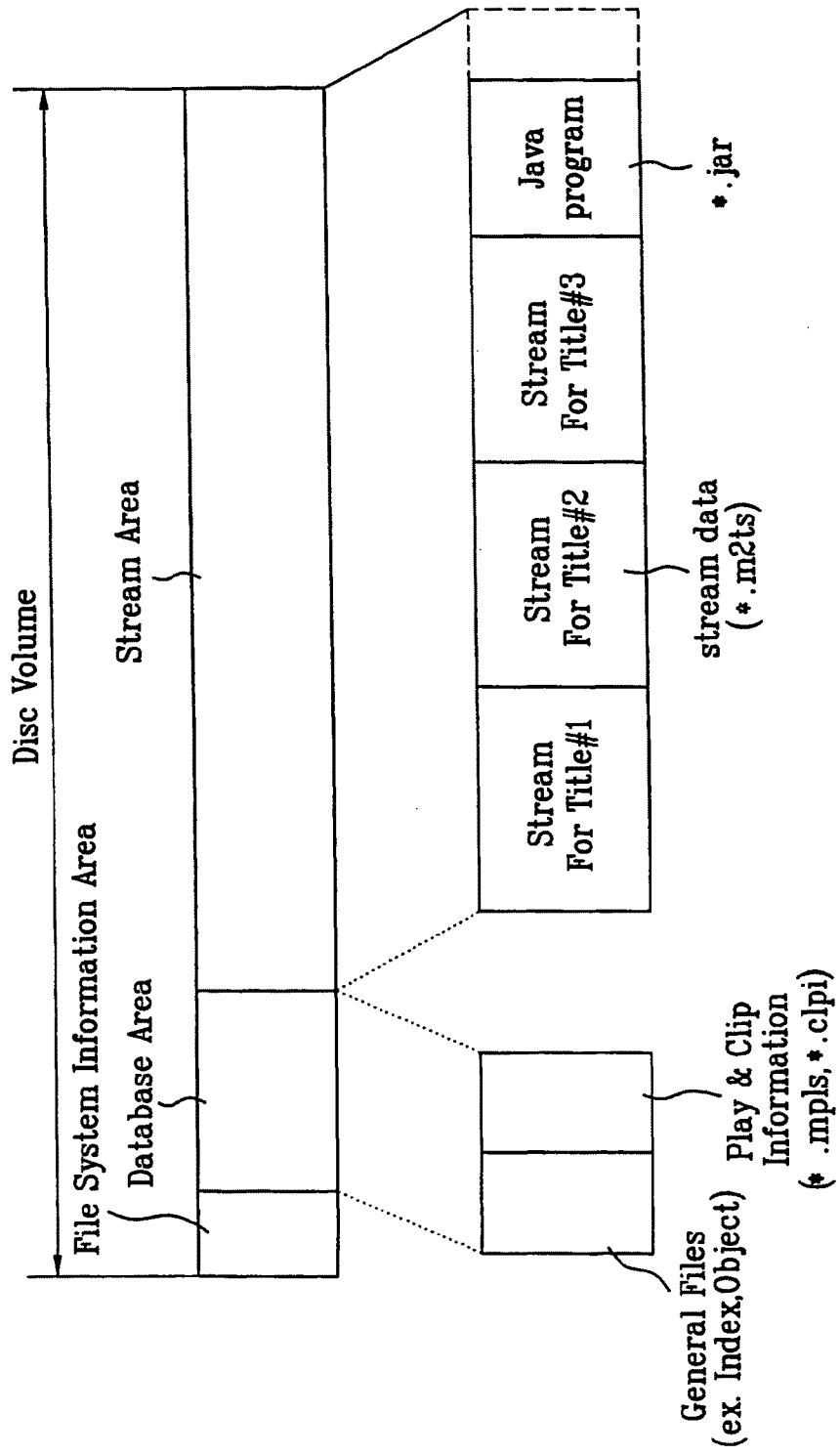
FIG. 3 is a structural diagram illustrating a data record structure recorded in an optical disc according to the present invention.

FIG. 3 is a structural diagram illustrating a data record structure recorded in an optical disc according to the present invention.

In more detail, FIG. 3 is a structural diagram illustrating an exemplary disc structure for recording information associated with the file structure of FIG. 2. As shown in FIG. 3, from the viewpoint of an inner area of the disc, the above-mentioned disc structure sequentially includes a file system information area serving as system information for managing overall files, a database area for recording a playlist file and a clip-info file to reproduce a recorded stream (*.m2ts), and a stream area for recording a plurality of streams composed of audio data, video data, and graphic data, etc. Particularly, it should be noted that data recorded in the stream area of the disc may be determined to be data having different attributes as previously stated above.

In association with the above-mentioned description, a predetermined area for recording the HDMV title and the Java title is called a title record area, and corresponds to the above-mentioned stream area. A predetermined area for recording file information for title reproduction is called a reproduction/management area, and corresponds to the file system information area and the database area. It should be noted that individual areas shown in FIG. 3 have been provided to describe an example, and the present invention is not limited to an arrangement structure of the above-mentioned areas shown in FIG. 3, and is applicable to other examples as necessary.

Figure 4:
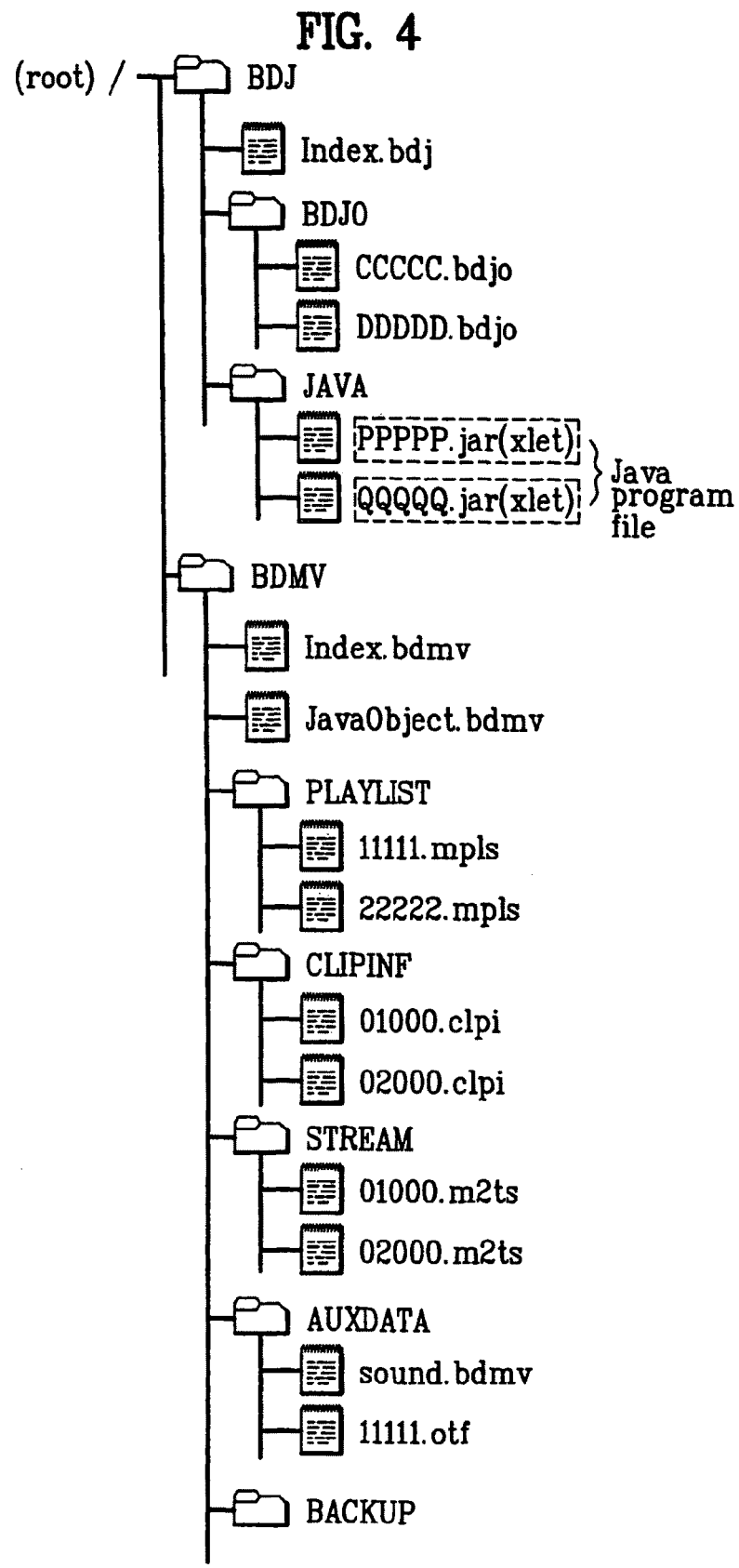
FIG. 4 is a conceptual diagram illustrating a file structure recorded in an optical disc acting as a recording medium in accordance with another preferred embodiment of the present invention.

FIG. 4 is a conceptual diagram illustrating a file structure recorded in an optical disc acting as a recording medium in accordance with another preferred embodiment of the present invention. As can be seen from FIG. 4, at least one directory is located under a single root directory, for example, a BDJ directory and a BDMV directory.

As previously stated in FIG. 2, the BDMV directory includes not only an index file "Index.bdmv" acting as a general file (i.e., an upper file) capable of guaranteeing user interactivity, but also an object file "MovieObject.bdmv". In this case, the index file "Index.bdmv" can index only the HDMV title. The BDMV directory includes a variety of directories for storing information of actual data recorded in a disc and other information associated with a method for reproducing the data, for example, a playlist directory (PLAYLIST), a clip information directory (CLIPINF), a stream directory (STREAM), an auxiliary directory (AUXDATA), and a backup directory (BACKUP).

The BDJ directory includes not only an index file "Index.bdj" acting as a general file (i.e., an upper file) capable of guaranteeing user interactivity, but also an object directory (BDJO)". In this case, the index file index file "Index.bdj" can index both the HDMV title and the Java title. The BDJO directory includes a variety of object files (e.g., "CCCCC.bdjo" and "DDDDD.bdjo"). The file structure shown in FIG. 4 includes the object directory (BDJO) composed of a plurality of Java object files, different from the file structure shown in FIG. 2.

The BDJ directory includes a Java directory (JAVA). The Java directory (JAVA) records a plurality of Java program files (e.g., PPPPP.jar or QQQQQ.jar) therein.

Figure 5A:
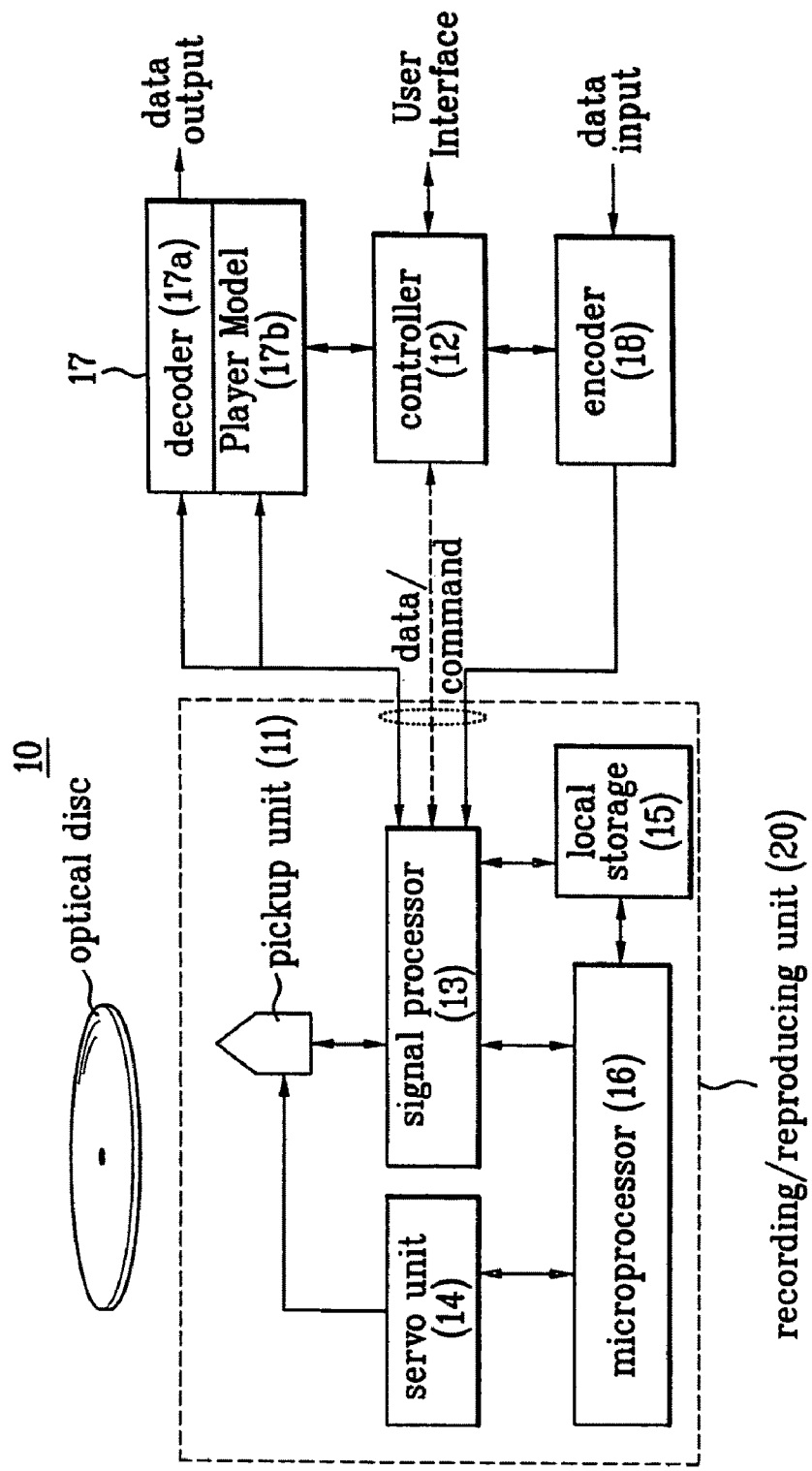
FIG. 5A is a block diagram illustrating an apparatus for reproducing data from a recording medium according to the present invention.
Figure 5B:
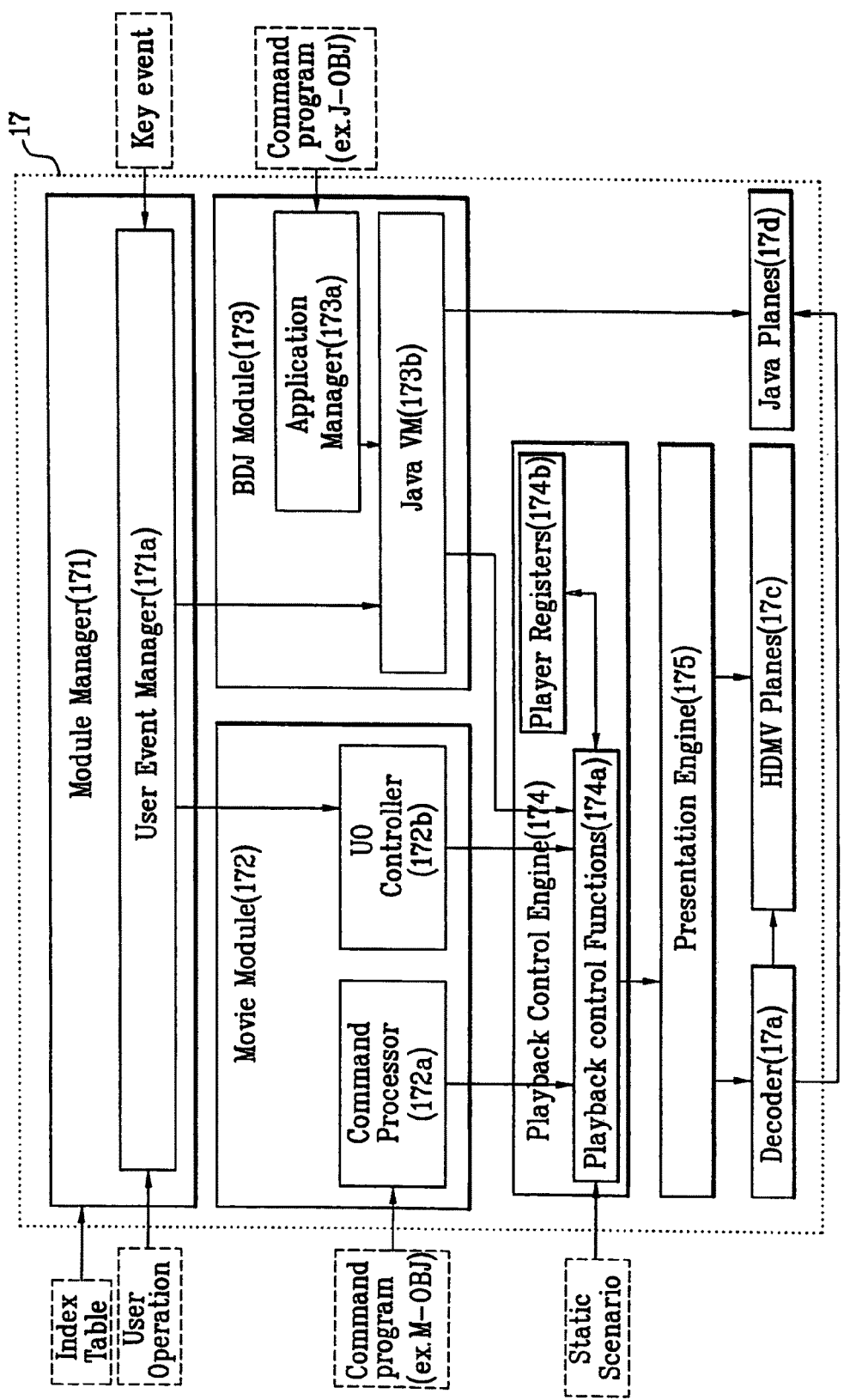
FIG. 5B is a block diagram illustrating a playback system for reproducing data of a disc in which titles having different attributes are recorded according to the present invention.

FIGS. 5A☐5B are block diagrams illustrating an optical recording/reproducing device according to the present invention. Particularly, FIG. 5A is a block diagram illustrating the optical recording/reproducing device 10 according to the present invention, and FIG. 5B is a block diagram illustrating a playback system 17 (also called a player model) for reproducing data of a disc in which titles having different attributes are recorded according to the present invention.

The optical recording/reproducing device 10 according to the present invention will hereinafter be described with reference to FIG. 5A.

Referring to FIG. 5A, the optical recording/reproducing device 10 includes a pickup unit 11, a servo unit 14, a signal processor 13, a local storage 15, and a microprocessor 16. The pickup unit 11 reads data recorded in a title record area of an optical disc, and reads management information including file information recorded in a reproduction management area. The servo unit 14 controls operations of the pickup unit 11. The signal processor 13 receives a reproduction signal from the pickup unit 11, restores the received reproduction signal to a desired signal value, or modulates a signal to be recorded into another signal recorded in the optical disc, such that it transmits the recovered or modulated result. The memory 15 stores information needed for reproducing data of the disc. The microprocessor 16 controls overall operations of the above-mentioned components contained in the optical recording/reproducing device 10. In association with the above-mentioned operations, the combination of the above-mentioned components 11, 14, 13, 15, and 16 is also called a recording/reproducing unit 20, and the recording/reproducing unit 20 can be manufactured in the form of a single product.

A controller 12 downloads additional data from outside of the optical disc upon receiving a command from a user, stores the downloaded additional data in the local storage 15, and forms a virtual file system for reproducing original data contained in the optical disc and additional data contained in the local storage 15. The controller 12 forms a virtual package including the original data and associated additional data using the virtual file system (VFS), and reproduces the original data and/or the additional data using the virtual package upon receiving a request from a user. In association with the above-mentioned description, the above-mentioned VFS and the above-mentioned virtual package will be described later with reference to drawings from FIG. 7.

The playback system 17 finally decodes output data upon receiving a control signal from the controller 12, and transmits the decoded result to the user. The playback system 17 includes a decoder 17a for decoding AV signals; and a player model 17b for analyzing a command or program contained in the object and a user command received from the controller 12 in association with reproduction of the above-mentioned specific title, and reproduces data on the basis of the analyzed result. However, it should be noted that the player model 17b may include the decoder 17a in some preferred embodiments, and the playback system 17 may correspond to the player model.

An encoder 18 converts an input signal into a specific format signal (e.g., an MPEG2 transport stream) upon receiving a control signal from the controller 12, and transmits the converted result to the signal processor 13, such that it can record a desired signal in the optical disc.

FIG. 5B is a detailed block diagram of the player model according to the present invention. The player model includes a module manager 171, a movie module 172, a BDJ module 173, a playback control engine 174, and a presentation engine 175.

The movie module 172 acting as an additional reproduction process module capable of reproducing the HDMV title and the BDJ module 173 acting as an additional reproduction process module capable of reproducing the Java title are constructed independently of each other. The movie module 172 receives a command or program contained in the above-mentioned object "M-OBJ", and the BDJ module 173 receives a command or program contained in the above-mentioned object "J-OBJ", such that the movie module 172 and the BDJ module 173 process the received command or program.

The movie module 172 includes a command processor 172a, and the BDJ module 173 includes an application manager 173a and a JAVA VM 173b, such that the movie module 172 and the BDJ module 173 are capable of receiving/processing the above-mentioned command or program.

The playback system 17 includes the module manager 171, the playback control engine 174, and the presentation engine 175. The module manager 171 transmits a user command to the movie module 172 and the BDJ module 173, and controls operations of the movie module 172 and the BDJ module 173.

The playback control engine 174 analyzes playlist file content data recorded in a disc upon receiving a reproduction command from the movie module 172 and the BDJ module 173, and performs a reproduction function on the basis of the analyzed result. Specifically, the playlist file content data constructs a static scenario.

The presentation engine 175 displays a specific stream managed by the playback control engine 174. Specifically, the playback control engine 174 includes a playback control function 174a for managing all the reproduction operations; a player status register (PSR) for indicating a reproduction environment or reproduction status of the player; and a player register 174b for storing general purpose register (GPR) information. The playback control function 174b may also be indicative of the playback control engine 174 as necessary.

A presentation engine 175 performs predetermined presentation using a display, such that it can provide a user with a specific stream whose reproduction is managed by the playback control engine 174.

The module manager 171, the movie module 172, the BDJ module 173, and the playback control engine 174 contained in the player model shown in FIG. 6b can be processed by software. It is preferable that the above-mentioned components 171, 172, 173, and the 174 be processed by software instead of hardware. The presentation engine 175, the decoder 17a, and the graphic planes 17c and 17d are generally hardware based. Constituent components (e.g., 171, 172, 173, and 174) processed by software may be integrated in one unit, such that the integrated unit may be installed into the controller 12. Therefore, it should be noted that the above-mentioned components of the present invention be understood on the basis of their meanings, and are not limited to their implementation methods such as hardware or software implementation.

In association with the above-mentioned description, the characteristics of the player model are as follows.

Firstly, as stated above, the movie module 172 for the HDMV title and the BDJ module 173 for the Java title are configured independently of each other, and the two modules 172 and 173 cannot be executed at the same time. In more detail, the Java title cannot be reproduced when the HDMV title is reproduced, and the HDMV title cannot be reproduced when the Java title is reproduced.

Secondly, the HDMV title and the Java title receive user commands based on different schemes, respectively. The HDMV title and the Java title use different methods for performing individual user commands. There is needed a predetermined unit capable of receiving the user command, and transmitting the received user command to either the movie module 172 or the BDJ module 173. In this case, the above-mentioned operations are performed by the user event manager 171a contained in the module manager 171. For example, if the received command is determined to be a user command entered by a User Operation (UO), the user event manager 171a transmits the user command to a UO controller 172b contained in the movie module 172. Otherwise, if the received command is determined to be a user command entered by a key event, the user event manager 171a transmits the received user command to the Java VM 173b contained in the BDJ module 173.

Thirdly, one of the modules 172 and 173 manages the above-mentioned playback control engine 174. In more detail, when reproducing the HDMV title, the movie module 172 acts as a master of the playback control engine 174. When reproducing the Java title, the BDJ module 173 acts as a master of the playback control engine 174.

Fourthly, the graphic plane is independently managed. For example, the HDMV planes 17c control the presentation engine 175 to act as a master. The Java planes 17d control the Java VM 173b contained in the BDJ module 173 to act as a master.

Figure 6:
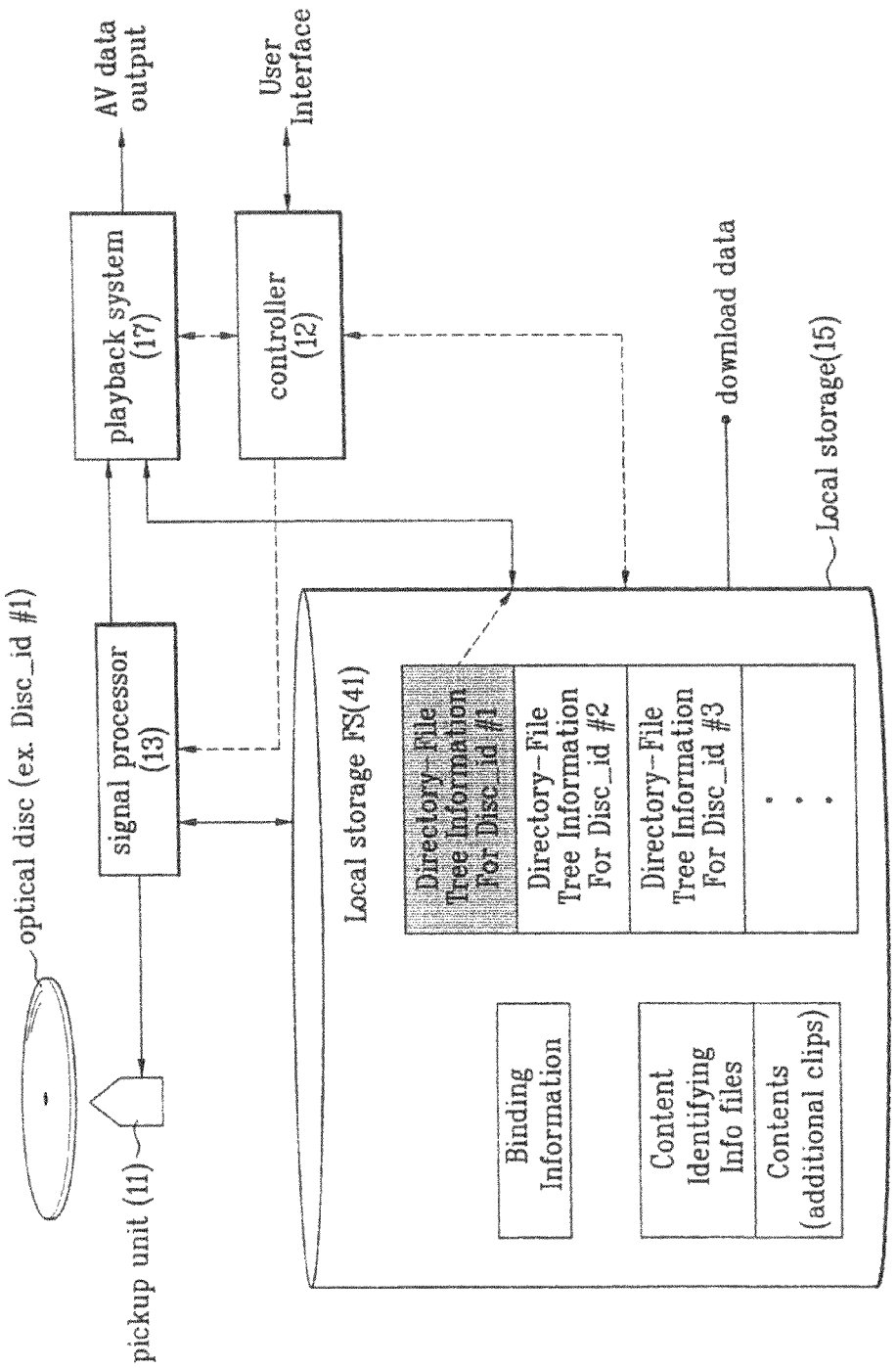
FIG. 6 is a block diagram illustrating an apparatus for reproducing data using a local storage from among overall components contained in an optical recording/reproducing device according to the present invention.

FIG. 6 is a block diagram illustrating an apparatus for reproducing data of an optical disc using a local storage from among overall components contained in the optical recording/reproducing device 10 shown in FIG. 5A according to the present invention.

Information stored in the local storage 15 will hereinafter be described. The local storage 15 according to the present invention stores file information (Directory-File Tree Information for Disc_id #n) including directories and files of individual disc identification (ID) information, and a plurality of additional clips downloaded from an external part. The local storage 15 may further store binding information for a binding operation associated with a disc package, and a plurality of files (Content Identifying Info files) for explaining content data stored in the local storage 15.

Specifically, the local storage 15 may include a plurality of file information units (Directory-File Tree Information for Disc_id #n) to cope with different discs. Therefore, the local storage 15 additionally requires a file system for managing the above-mentioned file information units. Specifically, the file system is also referred to as a local storage file system 41, and the local storage file system 41 is indicative of a system for managing all files stored in the local storage 15.

Therefore, if an optical disc (e.g., Disc_id #1) of a specific disc ID (Disc_id) is loaded in the optical recording/reproducing device 10, the controller 12 contained in the optical recording/reproducing device 10 recognizes ID information of the disc using the pickup unit 11 and the signal processor 13, reads file information equal to the loaded disc ID information from among all file information units stored in the local storage 15, forms a virtual package by binding (or combining) the read information and the disc package, and reproduces both the original data of the disc and the additional data of the local storage using the formed virtual package.

Figure 7:
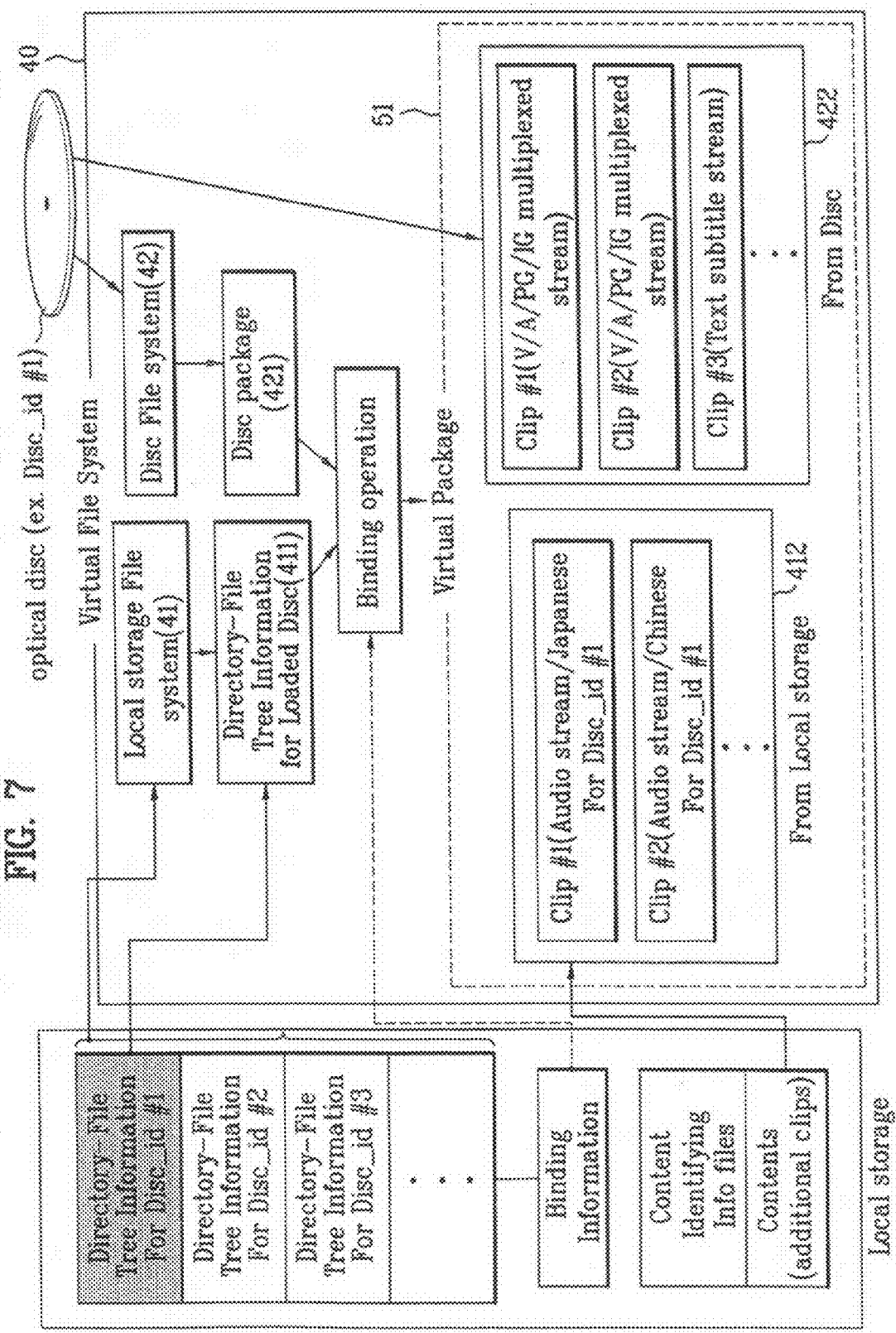
FIG. 7 is a conceptual diagram illustrating a method for forming a virtual package capable of simultaneously reproducing data recorded in a recording medium and data recorded in a local storage according to the present invention.

FIG. 7 is a conceptual diagram illustrating a method for forming the above-mentioned virtual package according to the present invention.

If a specific disc is loaded in the optical recording/reproducing device 10, the optical recording/reproducing device 10 reads the file system information 41 contained in the local storage 15, and at the same time reads disc file system information 42 including the file structure recorded in the disc, resulting in the creation of the VFS. In more detail, the virtual file system (VFS) is indicative of a file system virtually formed to manage both the file system contained in the local storage 15 and the other file system of the loaded disc.

The optical recording/reproducing device forms a new virtual package to simultaneously reproduce original data recorded in the disc and additional data recorded in the local storage using the above-mentioned virtual file system (VFS). For this purpose, the optical recording/reproducing device 10 reads file information (Directory-File Tree Information for Disc_id #n) associated with the disc (e.g., Disc_id #1) from the file system, and performs a binding operation for combining the read file information with a disc package of the loaded disc (Disc_id #1) or adding the read file information to the disc package.

The virtual package formed by the above-mentioned binding operation is indicative of a file structure for reproducing/managing an original clip 422 and an additional clip 412. The original clip 422 is composed of original data recorded in the disc. The additional clip 412 is composed of additional data recorded in the local storage.

Figure 8:
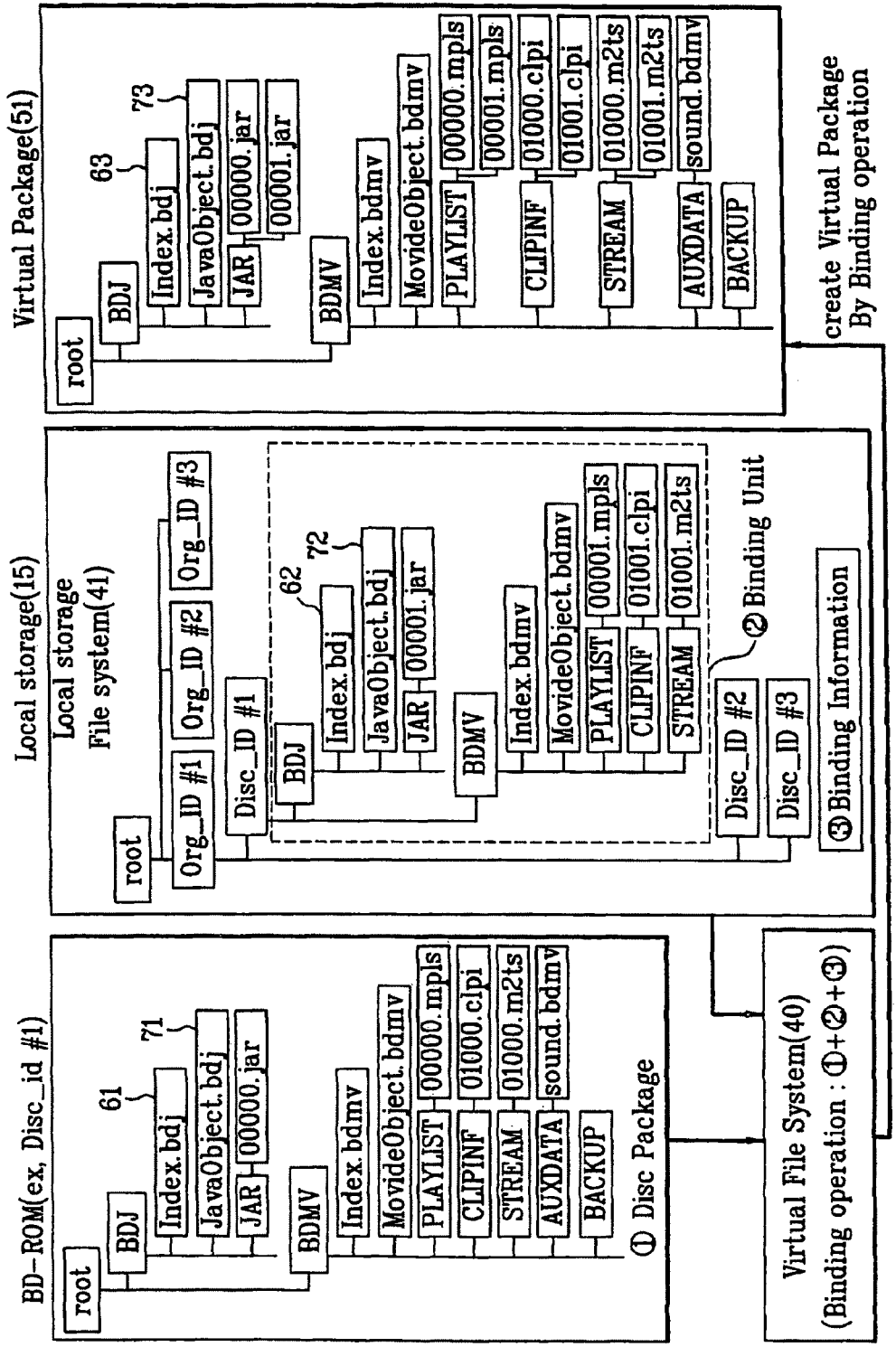
FIG. 8 is a conceptual diagram illustrating a method for forming the virtual package using a virtual file system (VFS) on the basis of a file structure according to the present invention.

FIG. 8 is a conceptual diagram illustrating a method for forming a virtual package using the virtual file system (VFS) on the basis of a file structure according to the present invention. Referring to FIG. 8, a specific file structure (i.e., the disc package of FIG. 2) is recorded in the loaded disc. The specific file structure is referred to as a disc package. A local storage file system 41 is contained in the local storage. The local storage file system 41 includes a binding unit combined with the loaded disc (e.g., disc_ID #1), and binding information.

In association with the above-mentioned description, the binding unit is basically similar to the disc file structure (i.e., the disc package). Specifically, the binding unit includes an index file and an object file, which have the same file names as those of index and object files of the disc, such that the index and object files of the binding unit can be combined with those of the disc. However, it should be noted that the binding unit cannot be operated as a reproduction/management file by itself, differently from the disc package. If it is assumed that the binding unit is designed to perform data reproduction by itself, this data reproduction is similar to data reproduction of the local storage.

The binding information includes a variety of information units associated with the binding unit, for example, file types of the binding unit, update times of the binding unit, and a binding method, etc. The above-mentioned binding information may also be referred to as a binding manifest file.

Therefore, the virtual file system (VFS) performs a binding operation for combining the binding unit with the disc package of the loaded disc using the above-mentioned binding information, such that it forms a new virtual package.

For example, an index file and an object file contained in the virtual package when the virtual package is formed can be formed by the following first and second methods.

The first method downloads pre-updated index and object files from a content provider (CP), such that there is no need for an optical recording/reproducing device to form an additional file. However, if the content provider (CP) transmits additional data associated with a specific recording medium, there is need to transmit updated index and object files in consideration of a binding operation associated with the recording medium.

The second method does not transmit updated index and object files, and controls the controller 12 contained in the optical recording/reproducing device to additionally form updated index and object files. The formed index and object files can be contained in the virtual package, such that they can effectively prevent network traffic from being generated. However, although the second method can allow a content provider (CP) to transmit index and object files, the transmitted index and object files act as files associated with transmitted additional data, instead of updated files capable of reproducing disc data.

During the binding operation of the binding unit, the index file 62 and the object file 72 contained in the binding unit, which have been received from a content provider (CP) acting as an external source or are received in real time, are equal to an index file 62, which is indicative of an index table of binding data formed by combining original data of an optical disc (e.g., Disc_id #1) acting as a recording medium and additional data received from an external part, and an object file 72 indicative of a command or program for reproducing the binding data, respectively.

For example, the index file 61 and the object file contained in the BDJ directory of the recording medium (e.g., Disc_ID #1) of FIG. 8 are associated with original data of the disc. The index file 62 and the object file 72 contained in the BDJ directory of the recording medium (e.g., Disc_ID #1) of the local storage 15 are equal to an index file 62 indicative of the last updated index table and the object file 72 in consideration of the binding operation between additional data transmitted from a content provider (CP) and original data of the recording medium. Therefore, the index file 63 and the object file 73 contained in the BDJ directory of the virtual package 51 are replaced with the index file 62 and the object file 72 contained in the local storage 15.

Other files contained in the virtual package formed after the binding operation has been performed include all files contained in the recording medium and all files contained in the binding unit. For example, FIG. 8 shows an example in which a playlist file, a clip-info file, and a stream file in the virtual package integrates files contained in the recording medium and with files contained in the binding unit. However, if the same files having the same function are contained in both the recording medium and the binding unit, the file contained in the binding unit is firstly contained in the virtual package. In other words, files contained in the binding unit have priority higher than those of files contained in the recording medium.

In association with the above-mentioned description, the local storage file system 41 includes a file structure for managing downloaded additional data. For example, the file structure includes "Org_id" directories for every content provider (CP) for providing additional data, and "Disc_id" directories for every specific disc in each of the Org_id" directories. The "Org_id" directories and "Disc_id" directories are configured in the form of a hierarchical structure.

Provided that the "Org_id #1" directory is determined to be a directory of a specific company "A" providing contents, the directories "Disc_id #1″ ⌐ "Disc_id #3" are configured according to disc types provided from the "A" company, and the user downloads additional data associated with the "Disc_id #1" directory, the downloaded additional data is contained in the binding unit contained in the above-mentioned "Disc_id #1" directory.

As stated above, the virtual package has the same structure as the disc package. Specifically, the virtual package includes index and object files 63 and 73 updated by the binding operation. By the above-mentioned updated index and object files 63 and 73, a clip-info file (01000.clpi) and a stream file (01000.m2ts) in the virtual package and a clip-info file (02000.clpi)) and a stream file (02000.m2ts) in the local storage are selectively or simultaneously reproduced.

Therefore, the index and object files 63 and 73 contained in the virtual package act as basic index and object files for simultaneously reproducing both original data recorded in the disc and additional data recorded in the local storage.

Figure 9:
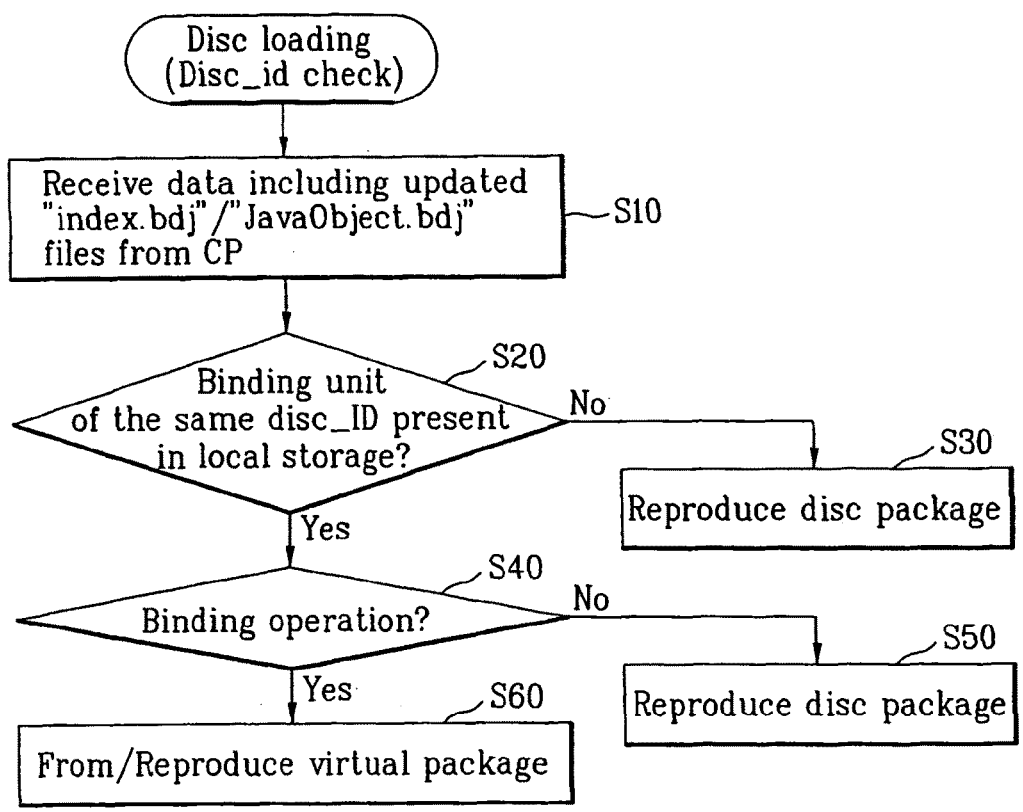
FIG. 9 is a flow chart illustrating a method for reproducing data of a recording medium using index and object files updated by a content provider (CP) according to the present invention.

FIG. 9 is a flow chart illustrating a method for reproducing data of a recording medium using index and object files updated by a content provider (CP) according to the present invention.

Referring to FIG. 9, if a disc is loaded in an optical recording/reproducing device, the optical recording/reproducing device recognizes disc ID information (disc_ID). The optical recording/reproducing device receives additional data from a content provider (CP). The received additional data includes updated index and object files "Index.bdj" and "JavaObject.bdj" at step S10.

Thereafter, it is determined whether the local storage of the optical recording/reproducing device includes additional data equipped with a binding unit having the same disc ID (Disc_id) as that of the loaded disc at step S20.

If the binding unit is contained in the local storage at step S20, it is determined whether the binding operation for combining (or binding) the binding unit with the disc package is executed at step S40. The virtual package is formed by the binding operation, and the original data stored in the disc and/or the additional data stored in the local storage are reproduced using the formed virtual package at step S60.

If there is no binding unit in the local storage at step S20, original data is reproduced using only the disc package recorded in the disc at step S30. Otherwise, if the execution of the binding operation is not desired at step S30, original data is reproduced using only the disc package recorded in the disc at step S50.

Figure 10:
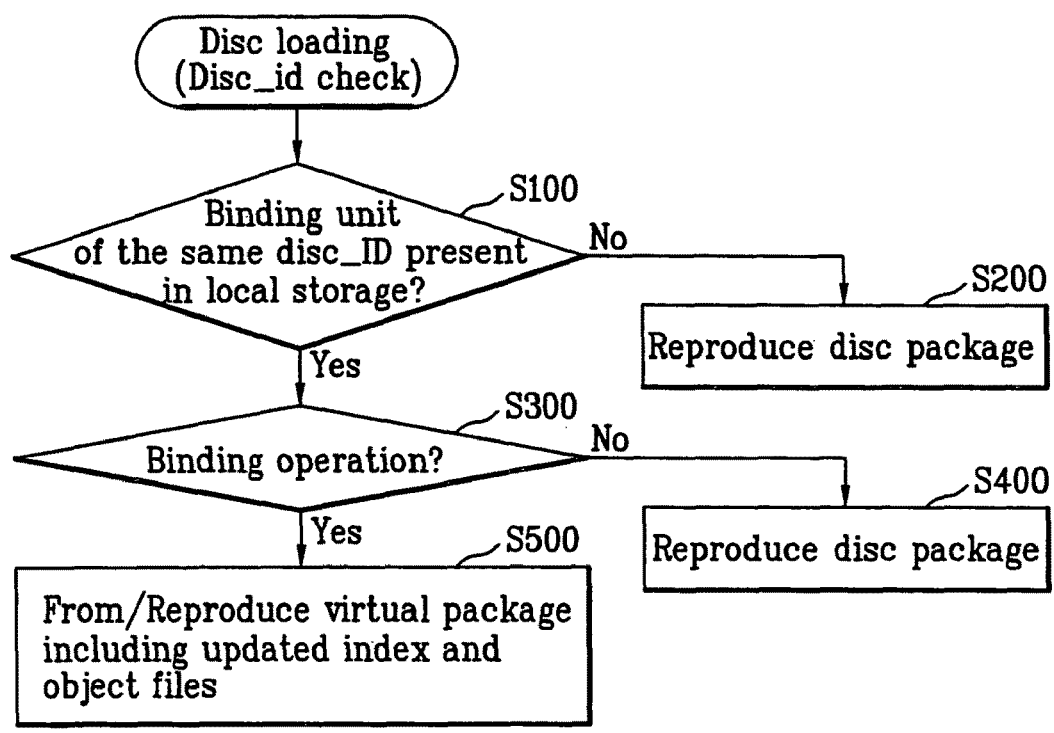
FIG. 10 is a flow chart illustrating a method for reproducing data of a recording medium using index and object files updated by a player according to the present invention.

Preferably, a predetermined step, which determines whether the loaded disc type is indicative of a disc for allowing disc data to be simultaneously reproduced along with additional data recorded in the local storage, may be further included in FIG. 9. For example, provided that a disc (e.g., a BD-ROM) having version information of at least Version 1.1 is loaded in the optical recording/reproducing device, the reproduction method shown in FIG. 10 is performed. Otherwise, provided that a disc (e.g., a BD-ROM) having version information of Version 1.0 or less is loaded in the optical recording/reproducing device, the above-mentioned reproduction method is not performed, but the optical recording/reproducing device reproduces only the original data recorded in the disc.

FIG. 10 is a flow chart illustrating a method for reproducing data of a recording medium using index and object files updated by a player according to the present invention.

FIG. 10 is characterized in that the controller 12 forms updated index and object files. Therefore, the controller 12 forms updated index and object files, which has been formed by integrating index and object files transmitted from the content provider (CP) with index and object files contained in the recording medium, such that it controls the formed files to be contained in the virtual package.

However, if the content provider (CP) does not transmit index and object files, the controller 12 forms updated index and object files capable of simultaneously reproducing additional data downloaded from the content provider (CP) and original data recorded in the recording medium, and controls the formed files to be contained in the virtual package. A detailed description thereof will hereinafter be described with reference to FIG. 10.

Referring to FIG. 10, if a disc is loaded in an optical recording/reproducing device, the optical recording/reproducing device recognizes disc ID information (disc_ID). It is determined whether the local storage of the optical recording/reproducing device includes additional data equipped with a binding unit having the same disc ID (Disc_id) as that of the loaded disc at step S100.

If the binding unit is contained in the local storage at step S100, it is determined whether the binding operation for combining (or binding) the binding unit with the disc package is executed at step S300. The virtual package is formed by the binding operation, and the original data stored in the disc and/or the additional data stored in the local storage are reproduced using the formed virtual package at step S500.

The virtual package formed by the binding operation includes updated index and object files "Index.bdj" and "JavaObject.bdj".

If there is no binding unit in the local storage at step S100, original data is reproduced using only the disc package recorded in the disc at step S200. Otherwise, if the execution of the binding operation is not desired at step S300, original data is reproduced using only the disc package recorded in the disc at step S400.

As apparent from the above description, a recording medium, a method and apparatus for reproducing data from the recording medium, and a method for forming a virtual package according to the present invention can effectively reproduce original data recorded in the recording medium and additional data downloaded from the content provider (CP) acting as an external source, resulting in greater convenience of use.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for reproducing data of a recording medium, the apparatus comprising:
   a pickup unit configured to read data from the recording medium;
   a local storage configured to store downloaded data associated with the recording medium, the local storage storing a local storage file system including an organization ID directory corresponding to a content provider, the organization ID directory including a disc ID directory corresponding to the recording medium; and
   a controller configured to
   check a disc ID of the recording medium,
   read data corresponding to the disc ID from the local storage,
   bind the read data with data recorded in the recording medium to form a virtual package.

2. The apparatus of claim 1, wherein the virtual package includes a Java directory formed by a combination of a Java program file contained in the downloaded data and a Java program file recorded in the recording medium.

3. The apparatus of claim 1, wherein the local storage further stores binding information for the binding.

4. The apparatus of claim 1, wherein the local storage stores a directory for a content provider providing the recording medium and the downloaded data.

5. The apparatus of claim 4, wherein the directory includes a directory for the recording medium.

6. A method for reproducing data of a recording medium comprising
   downloading data associated with the recording medium in a local storage;
   storing a local storage file system including the downloaded data in the local storage, the local storage file system including an organization ID directory corresponding to a content provider, the organization ID directory including a disc ID directory corresponding to the recording medium;

checking a disc ID of the recording medium;
reading data corresponding to the disc ID from the local storage; and
binding the read data with data recorded in the recording medium to form a virtual package.

7. The method of claim 6, wherein the virtual package includes a Java directory formed by a combination of a Java program file contained in the downloaded data and a Java program file recorded in the recording medium.

8. The method of claim 6, wherein the local storage further stores binding information for the binding.

9. The method of claim 6, wherein the local storage stores a directory for a content provider providing the recording medium and the downloaded data.

10. The method of claim 9, wherein the directory includes a directory for the recording medium.

* * * * *